United States Patent [19]

Pribnow

[11] Patent Number: 5,295,260
[45] Date of Patent: Mar. 15, 1994

[54] MEMORY RANGE MONITORING APPARATUS FOR A MULTIPROCESSOR COMPUTER SYSTEM

[75] Inventor: Richard D. Pribnow, Chippewa Falls, Wis.

[73] Assignee: Cray Research Systems, Inc., Minneapolis, Minn.

[21] Appl. No.: 708,461

[22] Filed: May 31, 1991

[51] Int. Cl.$^5$ .............................................. G06F 11/00
[52] U.S. Cl. ........................................ 395/575; 371/19;
395/425; 364/246.6; 364/246.7; 364/246.9;
364/DIG. 1; 364/969.1; 364/969.4; 364/969.3;
364/DIG. 2
[58] Field of Search .................. 395/575, 425; 371/19;
364/246.6, 246.7, 246.9, 969, 969.1, 969.3, 969.4

[56] References Cited

U.S. PATENT DOCUMENTS

| | | | |
|---|---|---|---|
| 3,937,938 | 2/1976 | Matthews | 371/19 |
| 4,573,119 | 2/1986 | Westheimer et al. | 364/200 |
| 4,682,283 | 7/1987 | Robb | 364/200 |
| 4,755,997 | 7/1988 | Takahashi | 371/19 |
| 4,878,168 | 10/1989 | Johnson et al. | 395/575 |
| 4,937,740 | 6/1990 | Agarwal et al. | 371/19 |
| 5,103,394 | 4/1992 | Blasciak | 395/575 |

*Primary Examiner*—Charles E. Atkinson
*Attorney, Agent, or Firm*—Merchant, Gould, Smith, Edell, Welter & Schmidt

[57] ABSTRACT

The present invention provides an apparatus for monitoring access by a processor in a computing system to certain defined portions of memory. According to the present invention, the user specifies an address or range of address (the "watchword") in memory to be monitored. Each processor contains hardware which monitors outgoing memory references. If the processor attempts to access the defined portion of memory, the present invention generates a signal which is sent back to the issuing processor to inform it that referenced the watchword in memory. The present invention has several applications. In particular however, the present invention can be used in conjunction with debugging software packages as an aid for debugging user software programs on multiprocessing computer systems. Specifically, the present invention can be used to pinpoint which processor in a multiprocessing computer system accessed the watchword portion of memory. For example, if a processor executed an instruction containing an error, causing improper calculation of a write destination address which resulted in data errors in memory, the present invention can pinpoint precisely which processor in the multiprocessing computer system executed the erroneous instruction, thus pinpointing the erroneous code to within a few instructions. An additional feature of the present invention is that it operates wholly independently and in parallel with the output circuitry of a processor. Thus, no additional levels of logic are introduced into the processor-to-memory path, and as a result the present invention does not adversely impact overall system performance.

17 Claims, 6 Drawing Sheets

FIG. 4

MEMORY RANGE MONITORING APPARATUS FOR A MULTIPROCESSOR COMPUTER SYSTEM

FIELD OF THE INVENTION

The present invention pertains generally to the field of computer systems, and more particularly to an apparatus for monitoring processor memory references to a defined range of memory addresses.

BACKGROUND OF THE INVENTION

Certain computing situations arise where it would be desirable to monitor processor memory references to a particular range of addresses in memory. One example of such a situation is in the debugging of computer software. Software errors, or "bugs", in computer programs can sometimes cause a processor to incorrectly calculate a write destination address. If this occurs, the information that was located at the improperly calculated memory address is overwritten and irretrievably lost. As a partial solution to this problem, operating systems are typically set up to assign each user program to its own specified range of memory locations, referred to as the program's addressable memory space. The operating system determines the amount of memory a particular user program will need and assigns that program a certain range of memory addresses defined by the base (the address where the programs memory starts) and limit (the address where the programs memory ends) addresses.

The program sees only the memory located between the base and limit addresses and does not have access to any other areas of memory. To the program, its memory is numbered from address 0 (base) to limit. This is referred to as the "logical" address. To get from a program logical address to the actual location in the actual physical memory address, the base address is added to the logical address. When a processor makes a memory reference request, the address is checked to ensure that the targeted address falls within that programs addressable memory space. If it does not, the processor is denied access to that memory location and an error message is generated.

This scheme maintains security on multiprocessing systems, in that users do not have access to the data or programs of other users. It also ensures that software bugs in one user program do not inadvertently destroy the information located in the addressable memory space of other programs.

Although limiting a program's addressable memory space prevents overwriting of data when processor attempts to access a location outside of its addressable memory space, it does not prevent a second type of memory destruction resulting from an improperly calculated destination address. This second type of situation can arise where a processor writes over the wrong memory location which is within its addressable memory space. For example, if a particular processor is running a user task which utilizes two data arrays, A and B, both within its addressable memory space, a bug in the program could cause the processor to miscalculate the destination address and put the data into A which should go into B. As a result both A and B would contain incorrect data.

This type of memory error would never be caught by circuitry checking for attempted access outside of the addressable memory space such as the base and limit scheme described above. As a result, by the time the error at the memory location is discovered (which could be many instructions later) it is very difficult to pinpoint where, when, and in what portion of the software the error occurred.

To isolate a software bug in single processor computers, programmers often insert "breakpoints" into the software code. For example, the program is broken into several parts, the portion of code between which breakpoints the error occurred is identified, several more breakpoints into that identified portion are set, etc., until the specific instruction fault is determined.

However, on multiprocessing computer systems where more than one processor may cooperate on a particular user task ("multitasking") it is difficult to tell which processor executed the software at fault and therefor nearly impossible to identify the faulty portion of code. This problem is due in part to the fact that several processors are cooperating on a single task and the user has no idea which processor is executing which portion of the code or even which processors were assigned by the operating system to work on the task.

The problem is further complicated by the fact that, on successive iterations through the same portion of code, the error may not surface at the same memory location, thus resulting in a "wandering" memory error. This can occur in a multitasking situation because the differing overall system environment on successive iterations may mean that not all of the same processors will come into the program at the same time and run on the same data as on a previous iteration. Once the program may run on five processors, the next time six, the next time four, etc. Also, a particular processor may well get different pieces of data and/or program to execute on successive iterations. Moreover, the timing of the code may be different every time through due to variations in processor memory reference priorities. All of these factors, which are constantly changing in a multiprocessing environment, may mean that a different processor gets a different iteration and fails in a different way every time through the erroneous piece of code. Thus, the problem of isolating which processor issued the faulty instruction causing the erroneous memory write to occur is a monumental task in a multiprocessing computer system.

Several debugging software packages exist which are designed to aid a programmer in pinpointing the problem code in a computer program. Debugging software automates the manual breakpoint setting procedures described above. Typically the debugging software is loaded onto a system along with a user program and essentially become a part of the program. The debugging software allows a user to set breakpoints in the user program. The breakpoints act as calls back to the debugging software, which in turn instruct the processor to check a memory location(s) (programmed by the user) to see if the location(s) has been modified. One way this can be done is to set breakpoints at the beginning and end of a user program subroutine. Thus every time a processor goes in or out of the subroutine, the debugging software is invoked and instructs the processor to check whether an address in memory has been modified. If the address location has been modified, the subroutine containing the faulty code has been identified and more breakpoints can be set within that subroutine to home in on the particular instruction at fault.

The debugging software described above works most effectively in a single processor system where only one processor is executing the program in an instruction by instruction fashion.

The debugging software does not work as effectively in a multiprocessing system. This is due to the fact that different processors are running in different subroutines and may be accessing the same range of memory addresses at the same time. Theoretically, every processor in the system could spot a modification, but since several different subroutines were running on different processors at the same time, the code at fault is not pinpointed to a particular subroutine. Thus, although debugging software can help a user to effectively pinpoint faulty code in a single processor system, they may be largely ineffective and inefficient for pinpointing faulty code which is running on multiprocessing computer systems.

Therefore, there is a need in the art for a debugging aid which can be used to pinpoint which processor in a multiprocessing computer system executed a faulty software instruction which caused a memory address to be calculated incorrectly by the processor and which further resulted in a write to the wrong memory location, destroying the data therein.

SUMMARY OF THE INVENTION

To overcome limitations in the art described above and to overcome other limitations which will become apparent upon reading the following detailed description, the present invention provides a memory range monitoring apparatus for monitoring processor to memory references to a defined range of memory addresses. The present invention further provides for the signaling of a processor when it has so referenced the defined range of memory. One preferred embodiment of the present invention can be used as an aid for debugging user software programs on multiprocessing computer systems.

According to the present invention, a user is able to set a range of addresses (a "watchword") which is to be monitored. Each processor has hardware associated with it for generating a signal when the processor issues a reference to the watchword. One preferred embodiment of the present invention is adapted to provide a hardware interrupt scheme whereby the user specifies an address or range of addresses in memory where data is being overwritten. The user is than able to set a "watchword" for that range of memory addresses which the present invention is to monitor for references. When a processor issues a write reference within that range of addresses, an interrupt is generated and sent back to the issuing processor. This interrupt halts execution of the interrupted processor. The operating system can then note to itself and to the debugging software (and hence the user) which processor executed the faulty portion of code. As a result, the user need only examine the register contents and the last few instructions issued by the interrupted processor to isolate the faulty software instruction. An alternate preferred embodiment sends the signal to a location in memory, which processors can then poll to determine whether the watchword has been referenced.

Because the debugging aid of the present invention operates wholly independently and in parallel with the normal operation of the multiprocessing computer system, its presence does not have an adverse impact on overall system performance.

BRIEF DESCRIPTION OF THE DRAWINGS

In the drawings, where like numerals refer to like elements throughout the several views:

FIG. 4 shows the exchange package used in the multiprocessing computer system of the type used in the present invention.

DETAILED DESCRIPTION OF THE PREFERRED EMBODIMENT

Figure 1:
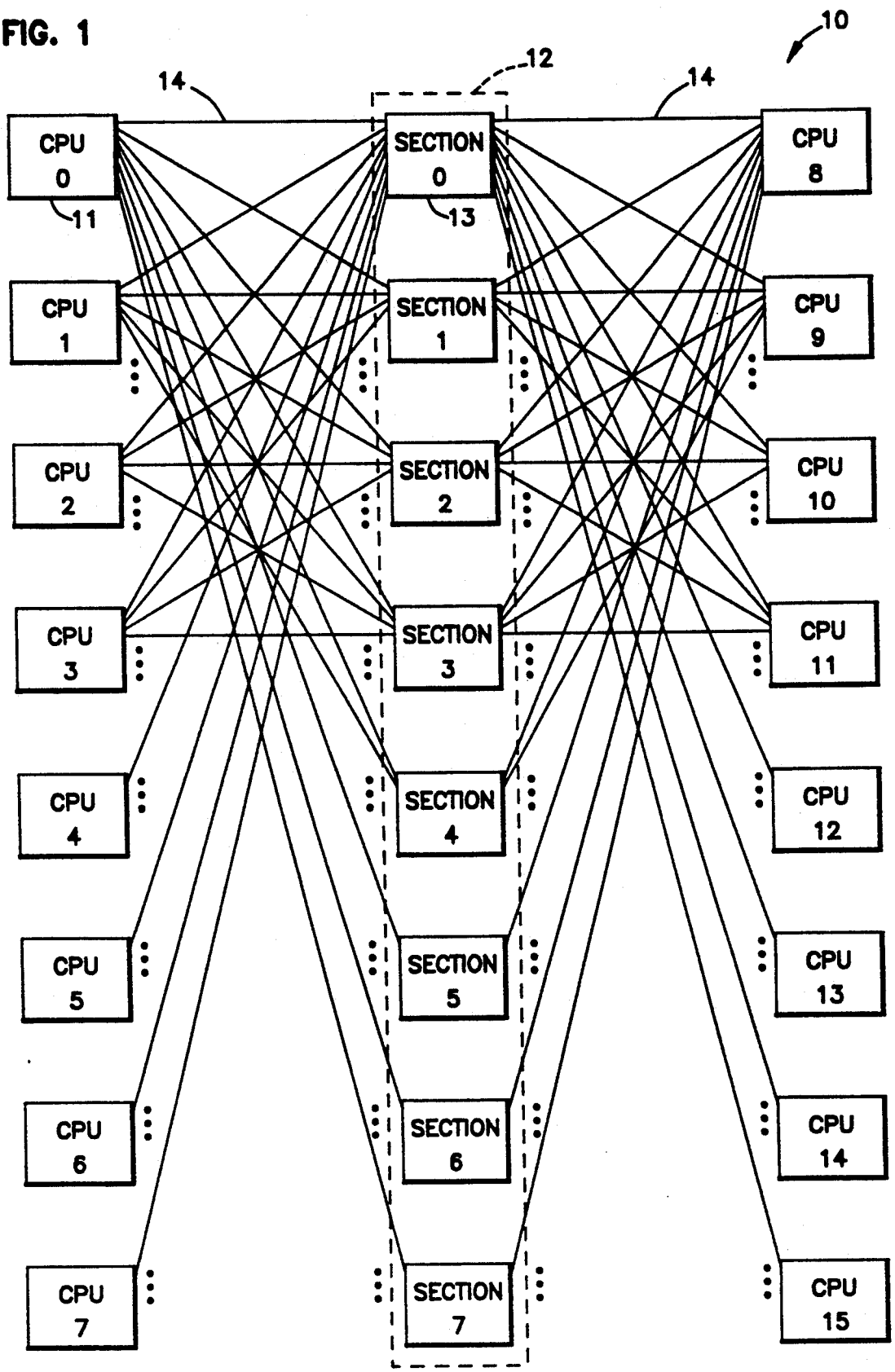
FIG. 1 is a simplified block diagram of the connection of the processors to memory in the multiprocessor system of the type used in the present invention.

As shown in FIG. 1, the present invention is specifically designed for a multiprocessor system 10 having 16 processors 11. It shall be understood, however, that the principles of the present invention can be applied to multiprocessor systems having a greater or lesser number of processors without departing from the scope of the present invention. An example of a processor of the type used in the multiprocessing system of the present invention can be found in co-pending U.S. patent application Ser. No. 07/657,127, filed Feb. 15, 1991, to Alan J. Schiffleger, entitled TWO-PIPE OPERATION IN VECTOR PROCESSOR FOR A MULTIPROCESSING SUPERCOMPUTERS, assigned to Cray Research, Inc., the assignee of the present invention, which application is incorporated herein by reference.

Memory 12 of multiprocessor system 10 is organized into 8 memory sections 13 in the preferred embodiment of the present invention. Each memory section 13 is further divided into 8 subsections (not shown in FIG. 1), which are further divided into 16 banks of memory (also not shown in FIG. 1). Each of the processors 11 is connected to each memory section 13 through a memory path 14. The system 10 provides that one read or write reference can be made every clock period on each path 14, for a total of 128 references per clock period.

In the preferred embodiment of the present invention, shared memory 12 is interleaved to reduce memory reference collisions between the processors. A more detailed description of the memory interleaving used in the multiprocessing computer system of the present invention can be found in the co-pending and commonly assigned U.S. patent application Ser. No. 07/618,685 filed Nov. 27, 1990, to Richard D. Pribnow, entitled DISABLED MEMORY SECTIONS FOR DEGRADED OPERATION OF A VECTOR SUPERCOMPUTER, which is incorporated herein by reference.

Figure 6:
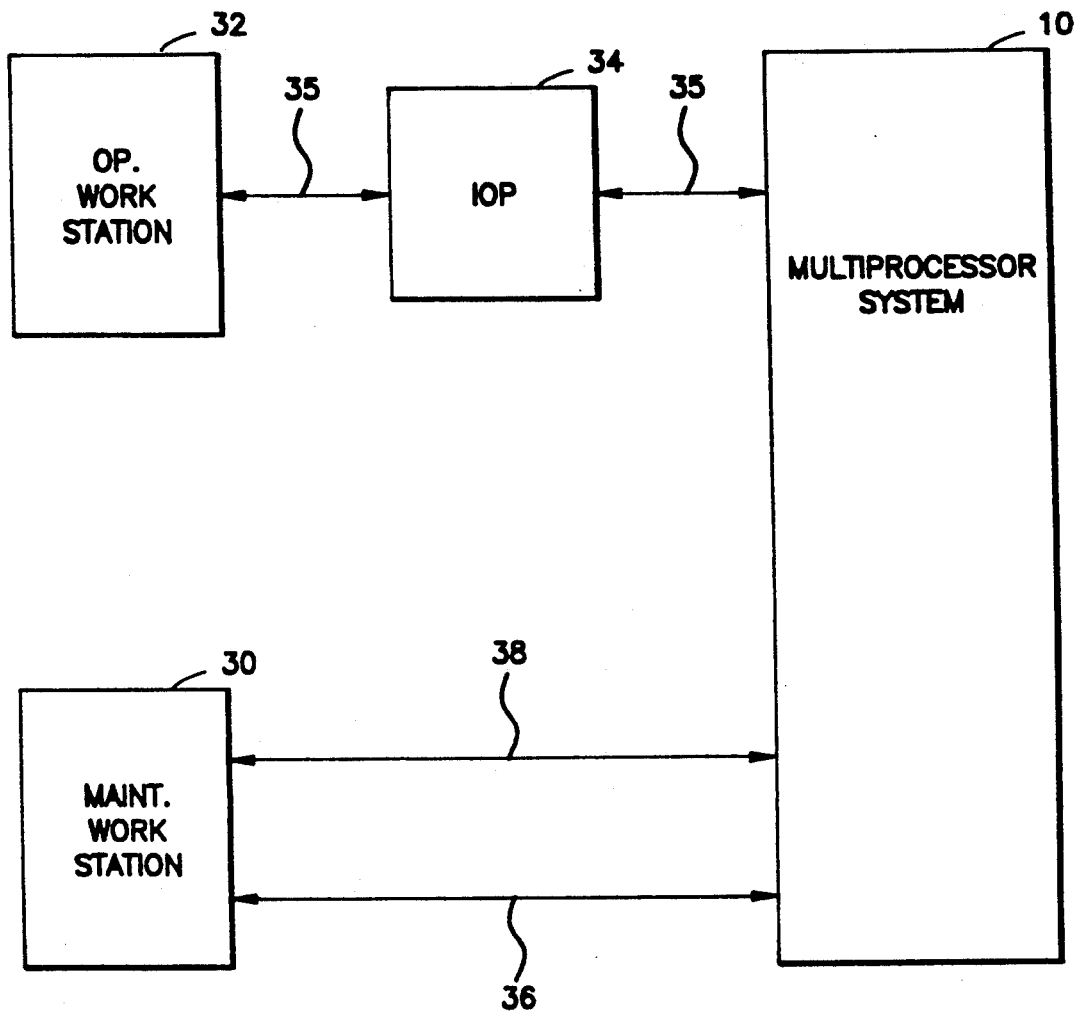
FIG. 6 shows a block diagram of the multiprocessor system of the present invention connected to a maintenance workstation through a maintenance channel and an error channel.

FIG. 6 shows a block diagram of the multiprocessor system 10 of the present invention connected to a maintenance workstation 30 through a maintenance channel 36 and an error channel 38. System 10 is also connected through an Input/Output Processor (IOP) 34 to an operator's workstation 32. A more detailed description of the design and operation of IOP 34 can be found in U.S. patent application Ser. No. 07/390,722, to Robert J. Halford et al. entitled, "Modular I/O System for Supercomputers", filed Aug. 8, 1989, assigned to Cray Research, Inc., the assignee of the present invention, which is incorporated herein by reference.

Maintenance workstation 30 and operator workstation 32 are comprised of small VME-based workstations with color graphic CRT, disk drives, etc. Those skilled in the art will readily appreciate that any computer system could be substituted for the VME-based workstation described above. Generally, operator workstation 32 is used by system operators to run user task software on multiprocessor system 10. Maintenance workstation 30 is used by maintenance personnel for running diagnostics on system 10 when hardware failures occur. Essentially, operator workstation 32 can be thought of as the "software connection" into system 10 and maintenance workstation 30 can be thought of as the "hardware connection" into system 10.

Figure 2:
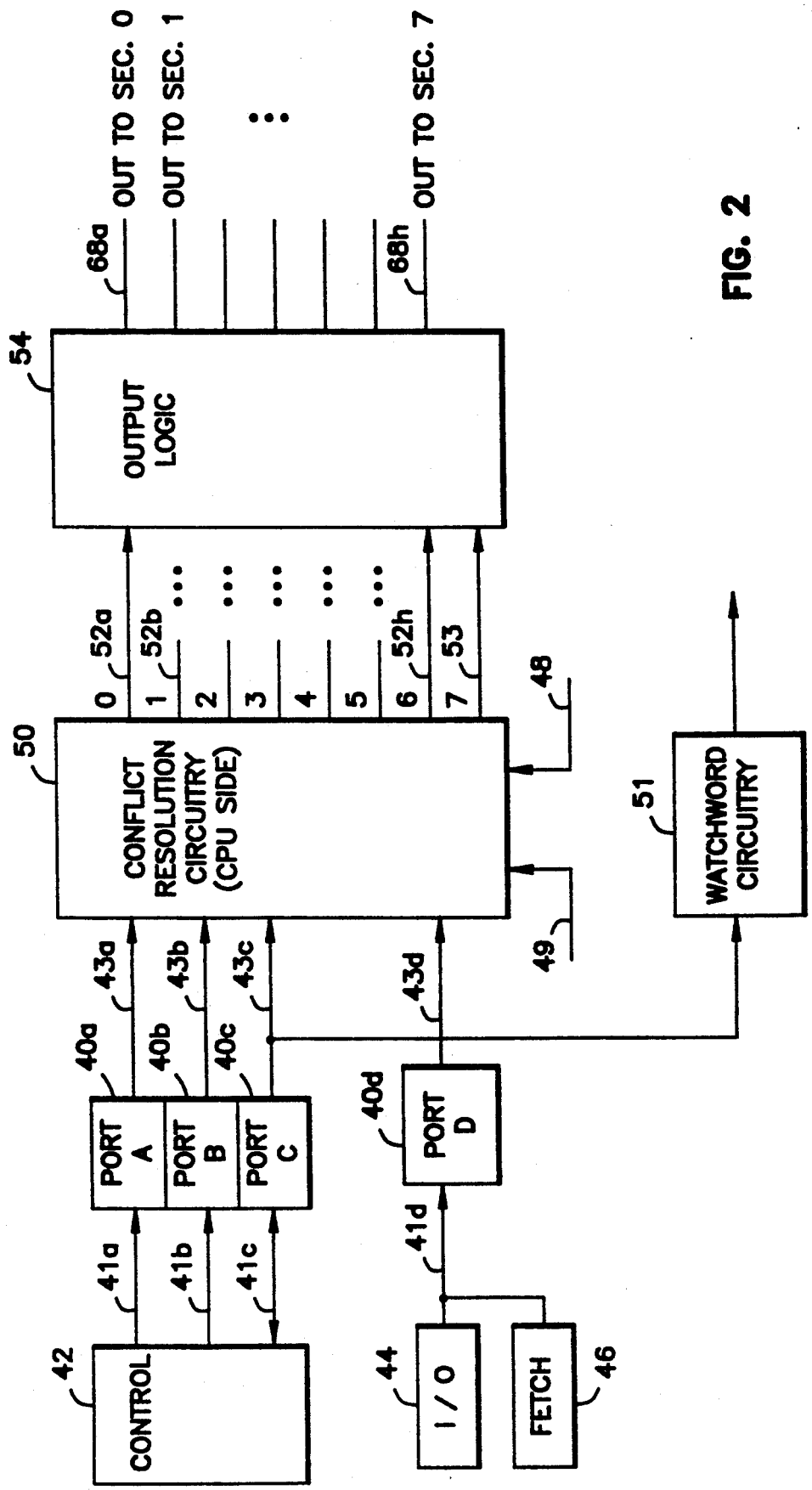
FIG. 2 shows a more detailed block diagram of a portion of the processor of the type used in the present invention.

FIG. 2 shows a block diagram of a portion of a processor of the type used in the preferred embodiment of the present invention. Each processor in system 10 has 4 ports to common memory, Port A 40a, Port 40b, Port 40c and Port D 40d. Ports A and B are read ports, Port C is a write port, and Port D is an I/O/fetch port. Control 42 contains all the registers and control circuitry necessary to set up Ports A–C and is connected to Ports A–C via lines 41a–c, respectively. I/O control 44 and fetch control 46 control Port D 40d via line 41d. I/O control 44 and fetch control 46 share line 41d on a multiplexed conflict scheme wherein fetch control 46 has the highest priority.

Each Port 40a–d is two words wide. Each port can therefore make two word references per clock period out of the processor for a total of 8 references per clock period per processor. The processor of the type used in the present invention can therefore also be thought of as an 8 port machine, wherein Port A includes references 0 and 1, Port B includes references 2 and 3, Port C includes references 4 and 5, and Port D includes references 6 and 7.

Conflict resolution circuitry 50 is an intraprocessor port reference arbitrator which resolves conflicts which occur when two references simultaneously attempt to access the same memory section. Output logic 54 contains cross-bar circuitry for routing the port references coming in on lines 52 to the appropriate memory section output 68. A more detailed description of the structure and operation of conflict resolution circuitry 50 and output logic 54 can be found in the aforementioned U.S. patent application entitled DISABLED MEMORY SECTIONS FOR DEGRADED OPERATION OF A VECTOR SUPERCOMPUTER.

According to the multiprocessing computer system of the present invention, write memory reference addresses are sent from control 42 to Port C 40c on line 41c. Port C 40c contains circuitry which adds the base address for that program to the logical address received from control 42 to translate the logical address into a 32-bit memory address corresponding to an actual physical memory location. This physical address is sent in parallel to conflict resolution circuitry 50 (on its way to memory) and to watchword circuitry 51 on line 43c (for purposes of the present invention). This parallel scheme ensures that the present invention does not adversely affect the performance of the system. By designing the present invention such that watchword circuitry 51 is not placed in the processor-to-memory path, processor references need not go through additional levels of logic on their way to memory. Hence, the watchword circuitry of the present invention merely monitors outgoing memory references from the processor but does not adversely impact system performance.

Figure 5:
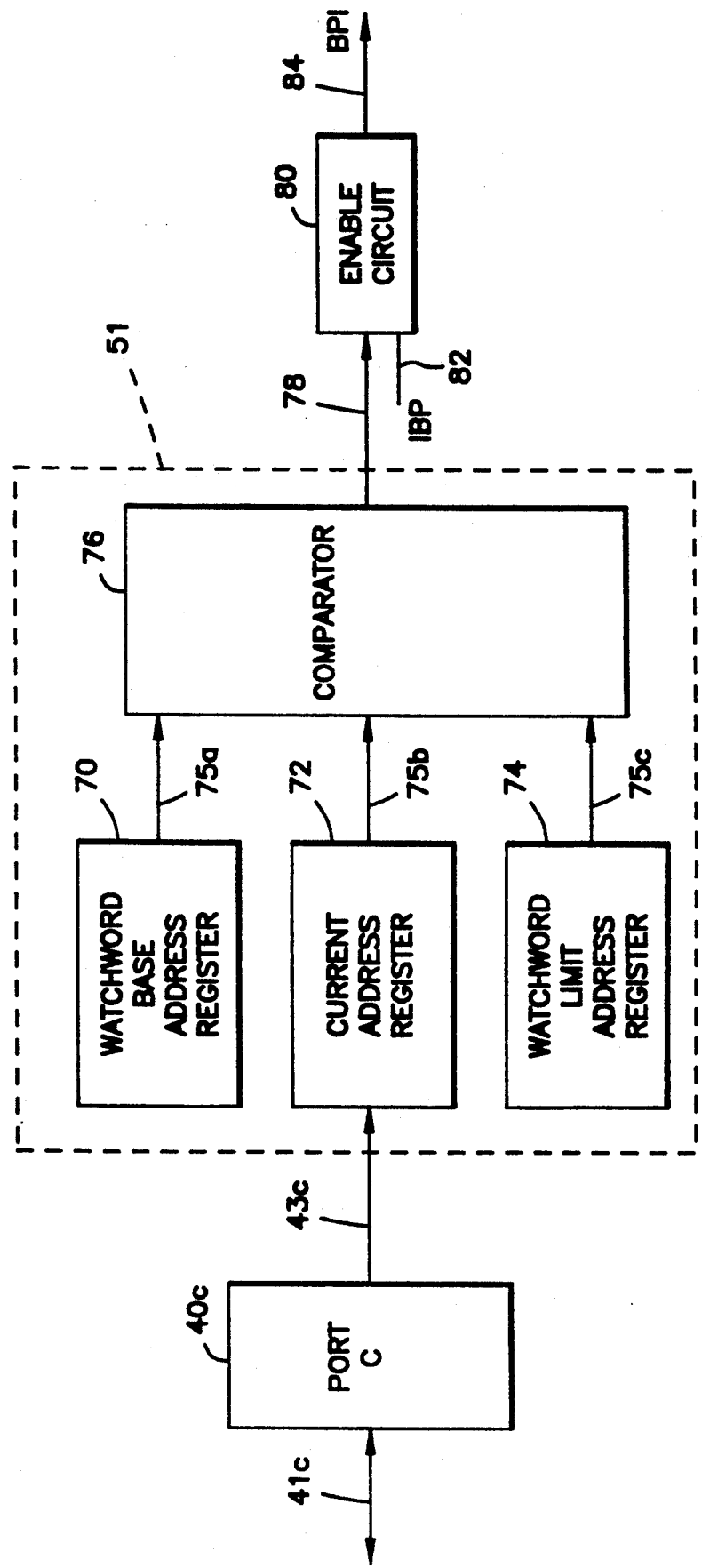
FIG. 5 shows a more detailed block diagram of the watchword circuitry of the present invention.

It is important to note for purposes of the present invention that because each port 40a–d is two words wide, there are actually two watchword circuits 51 connected to line 43c in the preferred embodiment of the present invention, one watchword circuitry for each of the two words of port C. For simplicity of illustration, however, only one watchword circuitry 51 is shown in FIG. 5.

The operation of the memory range monitoring apparatus will now be explained. For purposes of illustration, the present invention will be described in an illustrative preferred embodiment in which the present invention is used as a debugging aid for use in multiprocessing computer systems. However, as those skilled in the art will readily appreciate, other embodiments and applications of the memory range monitoring apparatus of the present invention could be used without departing from the scope of the present invention.

The essence of the present invention is to set up a "watchword" portion of memory and to monitor when a processor attempts to access that watchword. In the illustrative preferred embodiment, if a processor attempts to access that portion of memory, an interrupt is generated and control of the processor is sent through the operating system and to the debugging software. This interrupt halts execution in the interrupted processor. In this manner, the operating system can note which processor executed the error containing instruction and the user can quickly and efficiently locate the faulty instruction.

Figure 3:
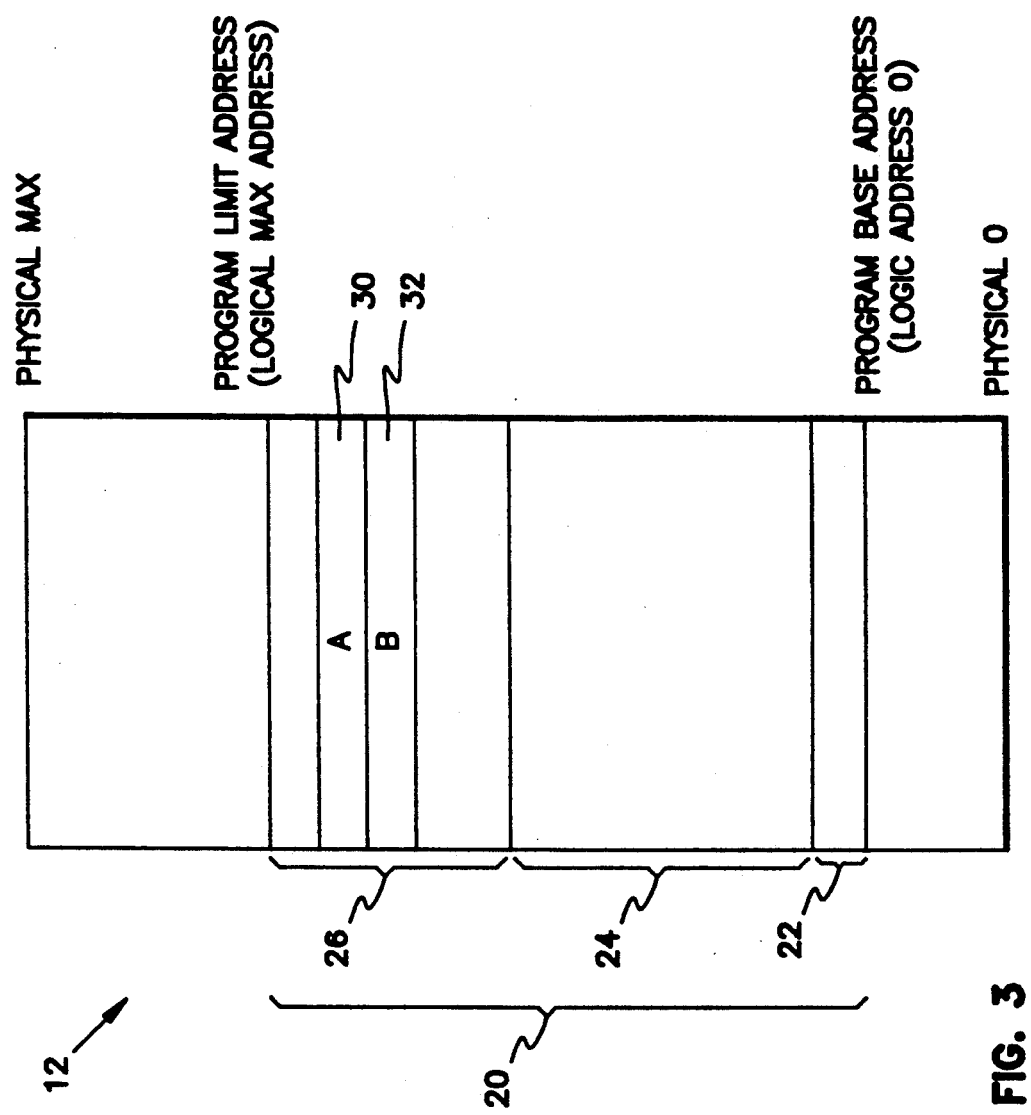
FIG. 3 shows a representational block diagram of the memory of the present invention showing the allocation of a user program to an addressable memory space.

FIG. 3 shows a representational block diagram of memory 12 of the multiprocessor system of the present invention. As stated herein previously, the operating system assigns each user program to an addressable memory space 20 defined by the program base and limit addresses. When the user program is loaded into memory 12, the debugging software is typically loaded first and on FIG. 3 is denoted as occupying memory address space 22. The user program itself occupies address space 24. Address space 26 is reserved for data needed by the user program. For this illustration 22, 24 and 26 are consecutive in memory, but need not be.

Assume that a user program is working on array B located in address space 32 in FIG. 3. If a portion of that code contains an error, the processor may improperly calculate a write destination address that is located in array A's address space 30, causing that data to be overwritten and destroyed. Also, B's data is not updated as it should be. As those skilled in the art are readily aware, this creates a problem because other processors working on other portions of the program dealing with arrays A and/or B will assume that all the data in arrays A and/or B is correct. Subsequently, when another subroutine reads that address in arrays A and/or B, the information it receives will not be correct. Because subroutines are programmed with certain assumptions about the data they are working with (e.g., whether the operands are integers or real numbers, the size of the numbers involved and the corresponding number of bits allotted for their storage, etc.) errors can occur if the information in a memory location does not match the expectations of the computer program. For example, data overflow or underflow errors can occur if numerical data does not match the order of magnitude expected by the program. If the information is necessary to calculate the write destination for another result, the program could improperly calculate a destination address that is outside of the programs addressable memory space. If the user program itself is overwritten, an error will occur because the information contained therein will most likely not correspond to a valid instruction. In addition, as those skilled in the art will readily appreciate, program errors can manifest themselves in many other different and varying ways in addition to those described above.

Although FIG. 3 shows the overwritten memory address A 30 to be in the data area of the user program, those skilled in the art will readily recognize that the user program itself could also be overwritten. Thus FIG. 3 should not be taken in a limiting sense, but rather for illustrative purposes only.

Once an error occurs, those skilled in the art are aware that a user can readily locate the memory location or range thereof which was incorrectly modified. This word or range of words, for purposes of the present invention, is termed the "watchword" range. The watchword range can be determined by several methods known in the art, such as by manually examining the instructions most recently executed, or by doing a dump of memory and examining the data therein which resulted from the error in the program.

Once the watchword range is determined, the user must manually examine the code and broadly estimate where in the code the error may be located. It is at the beginning of this estimated portion of code which the user sets a call to the debugging software. In general, the code subsequent to this point should not normally be expected to reference the watchword range. The debugging program, as discussed herein previously, gives a user access to the operating system and gives the user a controlled execution of the program for debugging purposes. This essentially allows the user to peer inside the internal workings of the system.

Figure 4:
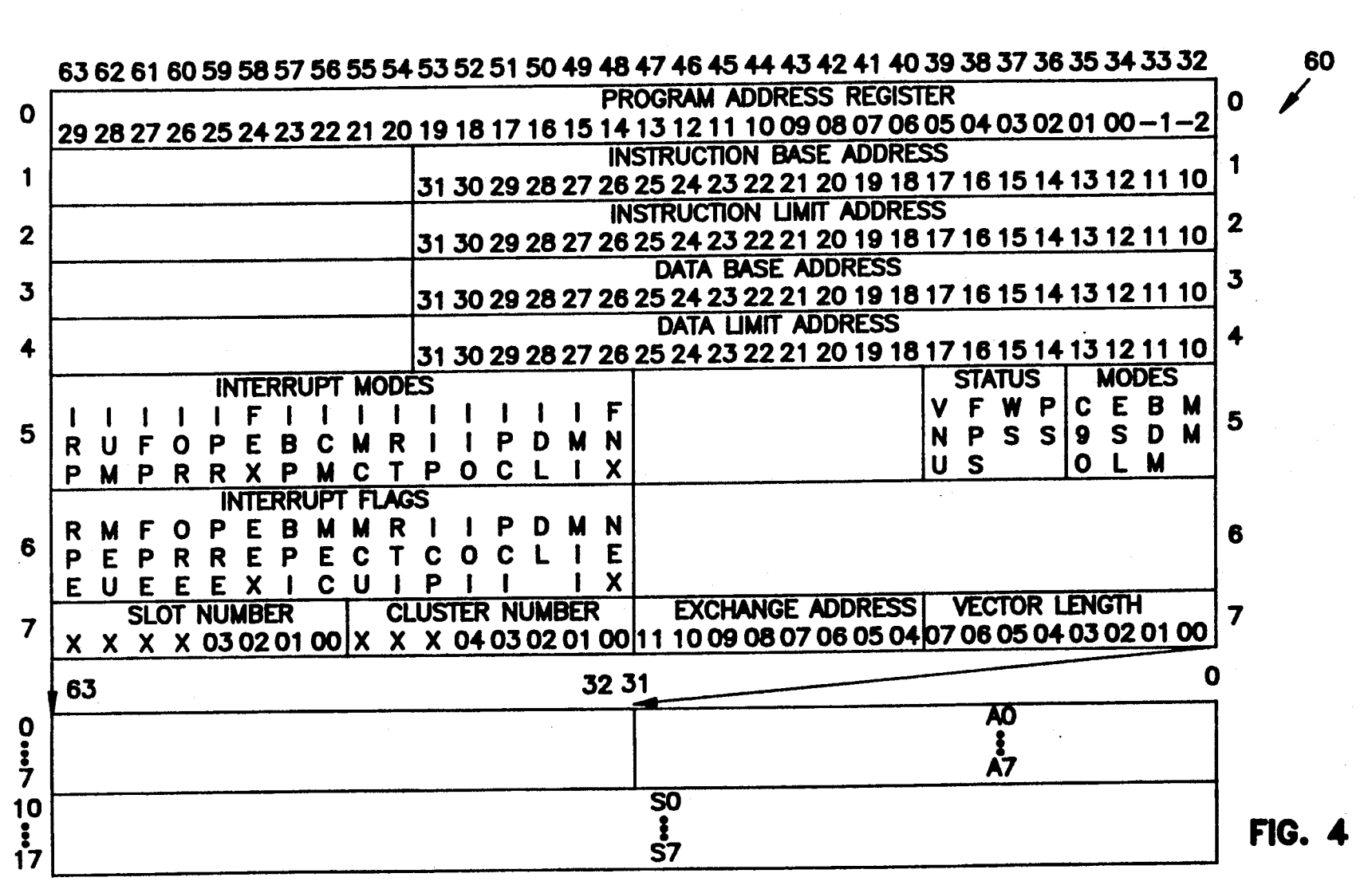

The debugging software gives a user the ability to enable or disable a hardware interrupt, called a "watchword" interrupt, which is generated by the present invention to signal which processor executed a program instruction containing an error. The user is able to enable or disable the watchword interrupt of the present invention by using two instructions available directly to the user program, tho ENABLE BREAKPOINT and DISABLE BREAKPOINT instructions, which set the appropriate bits in the exchange package. The exchange package 60 of the type used with the preferred embodiment of the present invention is shown in FIG. 4. Exchange package 60 is a 16 word block of data in memory associated with a particular computer program. Exchange package 60 contains the basic parameters necessary to provide continuity when a program stops and restarts from one section of the program to the next. The exchange package also holds the contents of the address (A) and scalar (S) registers. The address and scalar registers, along with the exchange package used in the present invention are described in more detail in the co-pending U.S. Patent Application Ser. No. 07/618,748, filed Nov. 27, 1990, entitled VECTOR SHIFT BY $V_0$ SHIFT COUNT IN VECTOR SUPERCOMPUTER PROCESSOR.

Table 1 describes the word and bit assignments for the interrupt modes, interrupt flags, status and mode fields of exchange package 60. It shall be noted that the watchword interrupt (BPI) is located in the INTERRUPT FLAGS field of the exchange package, word 6, bit 57, and the watchword interrupt enable (IBP) is located in the INTERRUPT MODES field of the exchange package at word 5, bit 57 in the preferred embodiment of the present invention. Those skilled in the art will readily recognize the BPI and IBP bits need not be located at the same word or bit position as the preferred embodiment described herein, and could be located at other word and bit positions without departing from the scope of the present invention.

TABLE 1

| INTERRUPT MODES | | |
|---|---|---|
| IRP | INTERRUPT ON REGISTER PARITY ERROR | |
| IUM | INTERRUPT ON UNCORRECTABLE MEMORY ERROR | |
| IFP | INTERRUPT ON FLOATING POINT ERROR | |
| IOR | INTERRUPT ON OPERAND RANGE ERROR | |
| IPR | INTERRUPT ON PROGRAM RANGER ERROR | |
| FEX | ENABLE FLAG ON ERROR EXIT (DOES NOT DISABLE EXCHANGE) | |
| IBP | INTERRUPT ON WATCHWORD | |
| ICM | INTERRUPT ON CORRECTABLE MEMORY ERROR | |
| IMC | INTERRUPT ON MCU INTERRUPT | |
| IRT | INTERRUPT ON REAL-TIME INTERRUPT | |
| IIP | INTERRUPT ON INTER-PROCESSOR INTERRUPT | |
| IPC | INTERRUPT ON PROGRAMMABLE CLOCK | |
| IDL | INTERRUPT ON DEADLOCK | |
| IMI | INTERRUPT ON 001 INSTRUCTION | |
| FNX | ENABLE FLAG ON NORMAL EXIT (DOES NOT DISABLE EXCHANGE) | |
| INTERRUPT FLAGS | | |
| RPE | REGISTER PARTY ERROR | |
| MEU | MEMORY ERROR - UNCORRECTABLE | |
| FPE | FLOATING POINT ERROR | |
| ORE | OPERAND RANGE ERROR | |
| PRE | PROGRAM RANGE ERROR | |
| EEX | ERROR EXIT (000 ISSUED) | |
| BPI | WATCHWORD INTERRUPT | |
| MEC | MEMORY ERROR - CORRECTABLE | |
| MCU | MCU INTERRUPT | |
| RTI | REAL-TIME INTERRUPT | |
| ICP | INTER-PROCESSOR INTERRUPT | |
| IOI | I/O INTERRUPT (IF IIO & SIE) | |
| PCI | PROGRAMMABLE CLOCK INTERRUPT | |
| DL | DEADLOCK (IF IDL & NOT MM) | |
| MII | 001 INSTRUCTION INTERRUPT (IF IMI & NOT MM) | |
| NEX | NORMAL EXIT (004 ISSUED) | |
| STATUS | | MODES |
| PS | PROGRAM STATUS | MM MONITOR MODE |
| WS | WAITING ON SEMAPHORE | BDM ENABLE BI-DI-RECTIONAL |
| FPS | VECTORS POINT STATUS | MEMORY |
| VNU | VECTORS NOT USED | ESL ENABLE SECOND VECTOR LOGICAL |
| | | C90 C90 MODE |

The debugging software also gives a user the ability to set the watchword base and limit addresses. These addresses are stored in the watchword base address register 70 and watchword limit address register 74 as shown in FIG. 5. Instructions are provided in the processor for the operating system to set registers 70 and 74. Those skilled in the art will readily appreciate that the operating system must set registers 70 and 74 because only the operating system knows the actual physical location of the programs addressable memory space in physical memory. In addition, because of changes in the overall system environment, programs are often swapped from one physical memory space to another, and therefore the operating system is needed to keep track of where the watchword range actually exists in physical memory.

Referring again to FIG. 5, a more detailed block diagram of the watchword circuitry 51 of the preferred embodiment of the present invention is shown. Again, a watchword circuitry 51 receives the 32-bit address in parallel with conflict resolution circuitry 50 (as shown in FIG. 2). This ensures that the operation of the debugging aid of the present invention does not adversely impact system performance. Instead, the present invention merely monitors the outgoing write references without inserting additional levels of logic into the processor-to-memory path.

FIG. 5 shows a more detailed block diagram of the hardware used to generate the BPI flag in the preferred embodiment of the present invention. When a processor issues a write reference, the 32-bit physical write destination address is loaded into current address register 72 contained in watchword circuitry 51. The watchword base address is set by the user through the operating system as described above and is loaded by the operating system into watchword base address register 70 and the watchword limit address is loaded into watchword limit address register 74. Comparator 76 compares the value of the current address with the watchword base and limit addresses. If the values in the registers 70, 72 and 74 satisfy the relationship $$base \leq current < limit,$$

the processor is issuing a reference to a memory address located within the watchword range. In that case, comparator 76 generates an interrupt signal, which is sent on line 78 to enable circuit 80. Enable circuit 80 logically combines the interrupt signal with enable IBP 82. The signals could be combined in a variety of ways well known in the art such as AND, OR, EXCLUSIVE OR, or a combination thereof. If the IBP enable is on, the BPI flag is generated, which is then sent back to the issuing processor on line 84 to halt execution in the processor and to turn processor control over to the operating system, to alert the operating system and the debugging software (and hence the user) that the processor attempted to write to a memory address located in the breakpoint range.

In the illustrative preferred embodiment of the present invention, when the processor receives the BPI flag from line 84, execution of the program in the interrupted processor is halted. As those skilled in the art are aware, however, a processor cannot be halted during execution of an instruction, or the state of the processor (i.e., its register contents, program counter, etc.) will be lost. Only after the instruction in execution at the time the interrupt is received is completely finished executing will the processor be stopped from executing another instruction.

Although the pipelined nature of the processors of the preferred embodiment of the present invention and the delay before the BPI flag is received may mean that a few instructions past the faulty instruction may be executed, the present invention has pinpointed the faulty code to within only a few instructions in a particular processor. As a result, a user need only examine those few instructions and the contents of the processors registers, data in memory, etc. to determine precisely which instruction contains the error.

Although a specific embodiment has been illustrated and described herein, it will be appreciated by those of ordinary skill in the art that any arrangement which is calculated to achieve the same purpose may be substituted for the specific embodiment shown. For example, the memory range monitoring apparatus of the present invention need not be implemented as a debugging aid. In addition, an interrupt need not be used to signal a processor that it has referenced the watchword range. Instead, the signal on line 78 of FIG. 5 could be sent to a location in memory and polled by the processors to determine if the watchword range has been referenced. Or the processor could be interrupted, but execution need not be halted, etc. This application is intended to cover any adaptations or variations of the present invention. Therefore, it is manifestly intended that this invention be limited only by the claims and the equivalents thereof.

I claim:

1. A method of isolating faulty program code in a multitasking multiprocessing system comprised of a plurality of processors, comprising the steps of:
    (a) identifying a memory range of addresses which are being addressed in error;
    (b) setting a watchword lower address corresponding to a base address of the identified memory range;
    (c) setting a watchword upper address corresponding to a limit address of the identified memory range;
    (d) issuing in each of the plurality of processors memory reference addresses to produce a plurality of memory reference addresses;
    (e) receiving the plurality of memory reference addresses;
    (f) comparing each memory reference address with the watchword lower address and the watchword upper address;
    (g) generating an output signal if in the comparing step (f) a memory reference address is greater than or equal to the watchword lower address and the memory reference address is less than the watchword upper address;
    (h) sending the output signal to the processor which issued the memory reference address and interrupting program execution in the processor which issued the memory reference address; and
    (i) reviewing program code executed by the interrupted processor to isolate the faulty program code.

2. The method according to claim 1 wherein the receiving step (e), comparing step (f) and generating step (g) are performed in parallel with an issuance of a processor memory reference.

3. The method according to claim 1 further comprising the step of a user setting the watchword lower address and the watchword upper address.

4. The method according to claim 1 further comprising the step of a user disabling the output signal.

5. The method according to claim 1 wherein the output signal is an interrupt which is sent back to the issuing processor.

6. The method according to claim 5 further comprising the step of a user disabling the interrupt.

7. An apparatus for isolating faulty program code in a multitasking multiprocessing system, comprising:
    means for determining a watchword range of addresses defined by a watchword lower address and a watchword upper address;
    a plurality of watchword circuitries, each connected to a different one of the plurality of processors, each watchword circuitry including:

first register means for storing the watchword lower address;

second register means for storing the watchword upper address;

third register means for receiving and for storing a processor memory reference address;

comparator means connected to the first, second and third register means, for comparing the processor reference address with the watchword lower address and with the watchword upper address; and interrupt means, connected to the comparator means, for interrupting the associated processor if the processor reference address is greater than or equal to the watchword lower address and the processor reference address is less than the watchword upper address.

8. The apparatus of claim 7 wherein the third register means, comparator means and generating means are connected in parallel with an output port of the processor.

9. The apparatus of claim 7 further adapted such that a user sets the watchword lower address and the watchword upper address.

10. The method of claim 7 further including means for disabling the interrupt means.

11. A computer program debugging apparatus for a multiprocessing computer system, comprising:

a plurality of breakpoint circuit means each connected to a write port of a different one of a plurality of processors, each breakpoint circuit means for comparing a write destination address with a watchword range of memory addresses, such that if the write destination address is within the watchword range of memory addresses, the breakpoint circuit means generates an intermediate interrupt signal;

a plurality of enabling circuit means, each connected to a different one of the plurality of the breakpoint circuit means each enabling circuit means for logically combining the intermediate interrupt signal with an interrupt enable signal, such that if the intermediate interrupt signal is set and the interrupt enable signal is set, the enabling circuit means generates an interrupt flag.

12. The computer program debugging apparatus of claim 11 wherein each breakpoint circuit further includes:

first register means for storing a value equal to a base address of the watchword range of memory addresses;

second register means for storing a value equal to a limit address of the watchword range of memory addresses;

third register means connected to the write port for storing the write destination address; and comparator means, connected to the first, second and third register means, for comparing the values stored in the first, second and third register means and for generating the intermediate interrupt signal when the value stored in the third register means is within the values stored in the first and second register means.

13. The computer program debugging apparatus of claim 12 wherein the comparator means is further adapted for generating the intermediate interrupt signal if the value stored in the third register means is greater than or equal to the value stored in the first register means and the value stored in the third register means is less than the value stored in the second register means.

14. The computer program debugging apparatus of claim 11 wherein the enabling circuit means is further adapted for logical AND ing of the intermediate interrupt signal and the interrupt enable signal to generate the interrupt flag.

15. The computer program debugging apparatus of claim 11 wherein the breakpoint circuit means is connected to the write port in parallel with processor output means for transmitting input/output messages between the processor and a shared memory, such that the breakpoint circuit means and the enabling circuit means do not insert any additional layers of logic between the processor and the shared memory and hence produce no associated degradation in system performance.

16. The computer program debugging apparatus of claim 11 further adapted such that a user defines the watchword range of memory addresses.

17. The computer program debugging apparatus of claim 11 further including means for disabling the interrupt.

* * * * *